(12) United States Patent
Watanabe et al.

(10) Patent No.: US 8,571,569 B2
(45) Date of Patent: Oct. 29, 2013

(54) BASE TRANSCEIVER STATION AND CHANNEL RATE CONTROL METHOD BASED ON RADIO QUALITY, CHANNEL QUALITY AND CPU LOAD

(75) Inventors: Takayuki Watanabe, Yokohama (JP); Hidehiko Oyane, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 795 days.

(21) Appl. No.: 12/508,001

(22) Filed: Jul. 23, 2009

(65) Prior Publication Data

US 2010/0022251 A1 Jan. 28, 2010

(30) Foreign Application Priority Data

Jul. 24, 2008 (JP) ................................. 2008-190750

(51) Int. Cl.
*H04B 17/00* (2006.01)
*H04W 72/00* (2009.01)
*H04W 4/00* (2009.01)
*H04B 1/38* (2006.01)

(52) U.S. Cl.
USPC ..................... 455/452.2; 455/67.11; 455/450; 455/452.1; 455/561; 370/340; 370/341

(58) Field of Classification Search
USPC ................ 455/450, 452.1, 67.11, 452.2, 561; 370/340, 341, 345, 346, 347, 348, 349, 370/350
See application file for complete search history.

(56) References Cited

U.S. PATENT DOCUMENTS

| | | | |
|---|---|---|---|
| 5,754,959 A | 5/1998 | Ueno et al. | |
| 6,597,699 B1 * | 7/2003 | Ayres | 370/400 |
| 6,996,081 B1 * | 2/2006 | Brouwer | 370/335 |
| 2007/0097983 A1 * | 5/2007 | Nylander et al. | 370/395.2 |
| 2007/0248060 A1 * | 10/2007 | Mooney et al. | 370/338 |
| 2008/0049618 A1 | 2/2008 | Ishii et al. | |
| 2008/0242301 A1 * | 10/2008 | Osterling et al. | 455/436 |

FOREIGN PATENT DOCUMENTS

| | | |
|---|---|---|
| JP | 3-135120 | 6/1991 |
| JP | 7-298340 | 11/1995 |

(Continued)

OTHER PUBLICATIONS

Espacenet description for JP2008092095.*

(Continued)

*Primary Examiner* — Vladimir Magloire
*Assistant Examiner* — Edd Rianne Plata
(74) *Attorney, Agent, or Firm* — Oblon, Spivak, McClelland, Maier & Neustadt, L.L.P.

(57) ABSTRACT

To provide a base transceiver station and channel rate control method for enabling the base transceiver station to execute stable processing in a radio communication system compliant with an HSDPA communication scheme, a base transceiver station 5 compliant with high speed downlink packet access is comprised of a Uu rate calculating section 16 that obtains radio quality between a radio access network 2 and a mobile terminal 6, a Ui rate calculating section 15 that obtains channel quality between the station 5 and a radio network controller 4, a CPU utilization measurement function section 17 that measures the CPU utilization of the station 5, and a CA calculating section 14 that calculates a permissible data amount using the radio quality, channel quality and CPU utilization.

9 Claims, 4 Drawing Sheets

(56) References Cited

FOREIGN PATENT DOCUMENTS

| JP | 2004-254201 |   | 9/2004 |
|----|-------------|---|--------|
| JP | 2005-57323  |   | 3/2005 |
| JP | 2006-166081 |   | 6/2006 |
| JP | 2007-259031 | * | 4/2007 |
| JP | 2008-53851  |   | 3/2008 |
| JP | 2008-92095  |   | 4/2008 |

OTHER PUBLICATIONS

Office Action issued on Oct. 26, 2011 in the corresponding Chinese Patent Application No. 200910164785.5 (with English Translation).
Office Action issued Jul. 3, 2012 in Japan Patent Application No. 2008-190750, filing date Jun. 25, 2012 with English translation (4 pages).
Office Action issued Jul. 3, 2012 in Japan Patent Application No. 2008-190750, filed Jun. 25, 2012 with English translation (4 pages).

* cited by examiner

| | CPU UTILIZATION THRESHOLD | CPU UTILIZATION CANCELLATION THRESHOLD | CA RATE REDUCTION AMOUNT |
|---|---|---|---|
| THRESHOLD#1 | 60% | 40% | 100kbps |
| THRESHOLD#2 | 80% | 60% | 200kbps |
| ... | ... | ... | ... |
| THRESHOLD#X | Y% | Y'% | Zkbps |

FIG. 3

BASE TRANSCEIVER STATION AND CHANNEL RATE CONTROL METHOD BASED ON RADIO QUALITY, CHANNEL QUALITY AND CPU LOAD

BACKGROUND OF THE INVENTION

1. Field of the Invention

The present invention relates to a base transceiver station and channel rate control method used in a radio communication system using an HSDPA (High Speed Downlink Packet Access) communication scheme.

2. Description of Related Art

Conventionally, systems using the HSDPA communication scheme have been known in radio communication systems including base transceiver stations. The radio communication system using the HSDPA communication scheme is constructed of a radio access network comprised of a radio network controller (RNC) and base transceiver station (BTS) lying below the radio network controller, and mobile terminals (UE: User Equipment) connected to the radio access network, varies throughput corresponding to radio environments of the mobile terminals and the number of connected terminals, and thereby actualizes improvements in radio utilization efficiency and high-speed transmission.

Further, in the radio communication system using the HSDPA communication scheme, since the throughput varies corresponding to radio environments of the mobile terminals and the number of connected terminals, problems occur that the data detention amount increases in the base transceiver station when the transmission rate between the radio network controller and base transceiver station is higher than the transmission rate in the radio channel and that utilization efficiency degrades in the radio channel when the transmission rate between the radio network controller and base transceiver station is lower than the transmission rate in the radio channel. To solve the problems, in the radio communication system using the HSDPA communication scheme, flow control is performed between the radio network controller and base transceiver station in accordance with the transmission rate in the radio channel.

More specifically, the base transceiver station calculates transmission quality based on the amount of data loss such as a break, dropout, discard, etc. of data between the base transceiver station and radio network controller, while further calculating radio quality based on throughput predicted from radio environments of mobile terminals and the number of connected terminals and the detention amount of the buffer in the base transceiver station, calculates permissible data amount for the radio network controller to transmit to the base transceiver station from the channel quality and radio quality, notifies the permissible data amount to the radio network controller, and thereby controls the transmission data amount from the radio network controller.

[Patent Document 1] Japanese Laid-Open Patent Publication No. 2008-053851

However, in the radio communication system as described above, there is a possibility of malfunctions in other functions such as call control processing, monitoring control and the like as well as the reception function in the base transceiver station when the radio network controller transmits the data amount exceeding the processing capability of the base transceiver station to the base transceiver station. Particularly, indoor-use small-size base transceiver stations are designed to low processing capability, and therefore, have the possibility of malfunctioning.

SUMMARY OF THE INVENTION

The present invention was made in view of the aforementioned respects, and it is an object of the invention to provide a base transceiver station and channel rate control method for enabling the base transceiver station to execute stable processing in a radio communication system compliant with an HSDPA communication scheme.

A base transceiver station of the invention is a base transceiver station compliant with high speed downlink packet access, and has a radio quality calculating section that obtains radio quality between a radio access network and a mobile terminal, a channel quality calculating section that obtains channel quality between the base transceiver station and a radio network controller, a CPU utilization measuring section that measures the CPU utilization of the base transceiver station, and a permissible data amount calculating section that calculates permissible data amount using the radio quality, channel quality and CPU utilization.

A channel rate control method of the invention comprises the steps of, in a base transceiver station compliant with high speed downlink packet access, obtaining radio quality between a radio access network and a mobile terminal, obtaining channel quality between the base transceiver station and a radio network controller, measuring the CPU utilization of the base transceiver station, calculating, in the base transceiver station, permissible data amount from the radio quality, channel quality and CPU utilization, and transmitting the permissible data amount to the radio network controller, and controlling, in the radio network controller, a channel rate between the radio network controller and base transceiver station based on the permissible data amount.

According to this constitution, since the CPU utilization is included in calculation parameters for the permissible data amount, the permissible data amount is calculated in consideration of the processing capability of the base transceiver station. Accordingly, the radio network controller does not transmit data exceeding the processing capability of the base transceiver station, and therefore, the base transceiver station is capable of executing stable processing.

The permissible data amount calculating section corrects the permissible data amount obtained from the radio quality and channel quality with a correction value that is based on the CPU utilization, and is thereby capable of calculating the permissible data amount.

Further, the permissible data amount may be the corrected permissible data amount obtained by correcting the permissible data amount obtained from the radio quality and channel quality with a correction value that is based on the CPU utilization.

According to this constitution, it is possible to correct the permissible data amount obtained from the radio quality and channel quality with a correction value that is based on the CPU utilization.

Further, the correction value may be permissible data amount reduction amount corresponding to at least one of CPU utilization thresholds and/or at least one of correction cancellation thresholds.

Moreover, in the channel rate control method, it is possible to vary the correction value corresponding to at least one of CPU utilization thresholds and/or at least one of correction cancellation thresholds.

According to this constitution, it is possible to vary the correction value in a simplified control configuration. Further, when there are provided a plurality of CPU utilization thresholds and a plurality of correction cancellation thresholds, it is possible to vary the correction value in a stepwise manner, and calculate more suitable permissible data amount in response to a change in CPU utilization.

Further, the permissible data amount calculating section may cancel a correction to the permissible data amount using the correction cancellation threshold.

Furthermore, in the channel rate control method, a correction to the permissible data amount may be canceled using the correction cancellation threshold.

According to this constitution, when the CPU utilization falls below the correction cancellation threshold, it is possible to cancel the correction to the permissible data amount.

Further, the base transceiver station may be a small-size base transceiver station where the number of carriers is 1 or less, and the number of maximum concurrent connections is 4 or less.

According to this constitution, it is possible to construct a radio communication system at low cost by adopting the small-size base transceiver station.

BRIEF DESCRIPTION OF THE DRAWINGS

FIG. 3 is a view showing an embodiment of the base transceiver station according to the invention and is a table showing an example of a permissible data amount correction table;

FIG. 4(a) shows graphs for comparing CPU utilization and throughput of the base transceiver station with CPU utilization and throughput of a conventional base transceiver station without including the CPU utilization in calculation parameters for permissible data amount, and FIG. 4(b) is a table showing an example of the permissible data amount correction table.

DETAILED DESCRIPTION OF THE PREFERRED EMBODIMENTS

Figure 1:
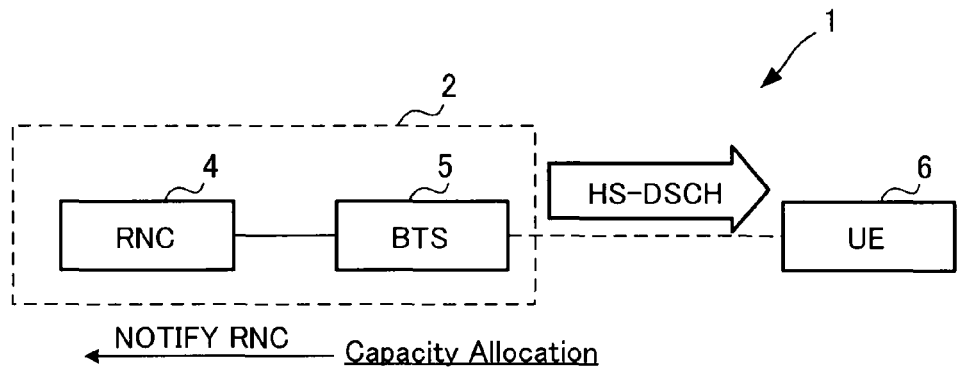
FIG. 1 is a view showing an embodiment of a base transceiver station according to the invention and is a block diagram of a radio communication system.

Embodiments of the present invention will specifically be described below with reference to accompanying drawings. FIG. 1 is a block diagram of a radio communication system.

As shown in FIG. 1, the radio communication system 1 is constructed of a radio access network 2 comprised of a radio network controller 4 and base transceiver station 5 connected to the radio network controller 4 by wired connection, and a mobile terminal 6 connected to the radio access network 2 by wireless connection. Further, in the radio communication system 1, the HSDPA communication scheme is used, and in accordance with a change in throughput corresponding to the radio environment of the mobile terminal 6 and the number of connected terminals, flow control is performed between the radio network controller 4 and base transceiver station 5.

The radio network controller 4 performs radio control for assigning a radio channel between the mobile terminal 6 and base transceiver station 5 and others, while monitoring the radio channel between the mobile terminal 6 and base transceiver station 5. The radio network controller 4 assigns a High Speed Downlink Shared Channel (HS-DSCH) as a radio channel, and thereby offers the HSDPA service to the mobile terminal 6.

The base transceiver station 5 is a small-size base transceiver station where the number of carriers is 1 or less and the number of maximum concurrent connections is 4 or less, and transmits data received from the radio network controller 4 to the mobile terminal 6 as a radio signal. Further, the base transceiver station 5 calculates permissible data amount based on radio quality between the radio access network 2 and mobile terminal 6, channel quality between the radio network controller 4 and base transceiver station 5, and the processing capability of the base transceiver station 5, includes the permissible data amount in a permissible data amount control signal (CA: Capacity Allocation) to notify the radio network controller 4, and thereby controls the transmission data amount from the radio network controller 4.

Figure 2:
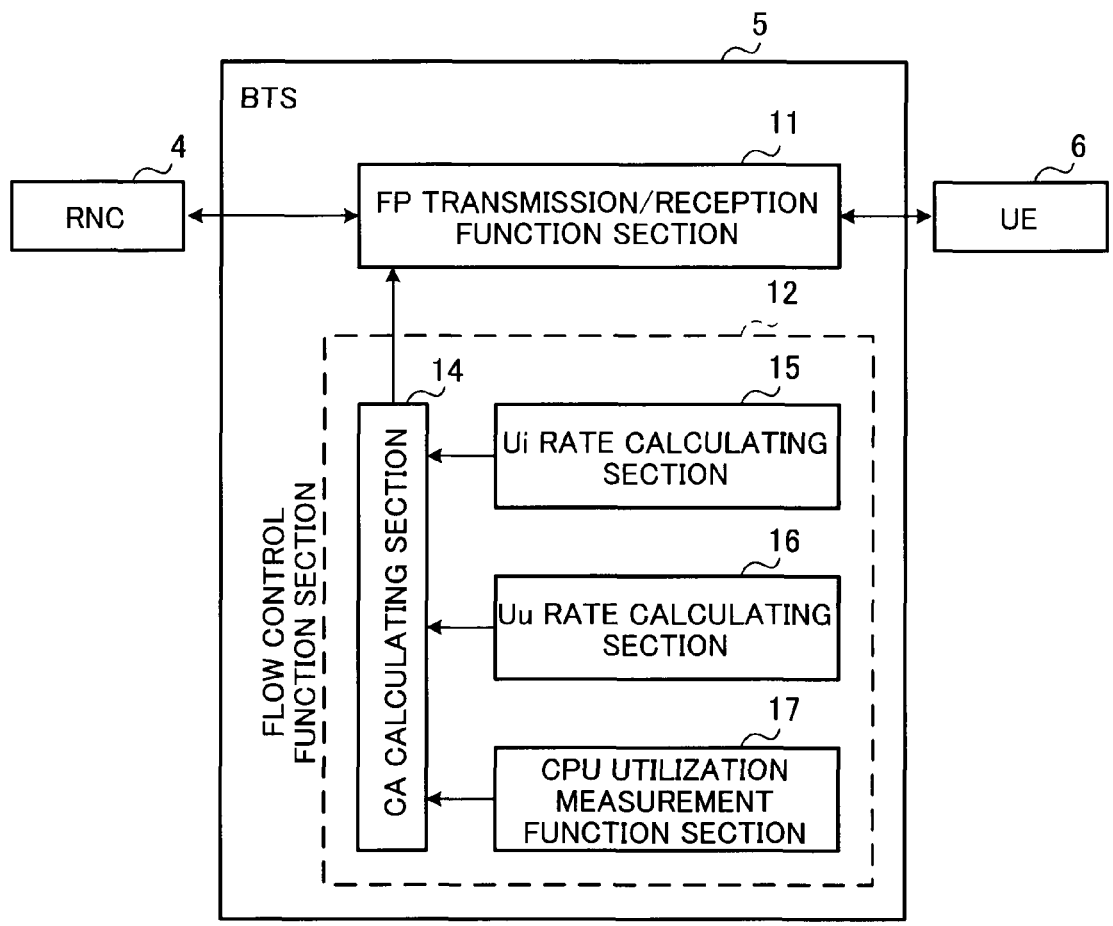
FIG. 2 is a view showing an embodiment of the base transceiver station according to the invention and is a control block diagram of the base transceiver station.

In other words, in the radio communication system 1, the transmission data amount from the radio network controller 4 is controlled, in consideration of the transmission quality from the radio network controller 4 to the mobile terminal 6. The base transceiver station will specifically be described below with reference to FIG. 2. FIG. 2 is a control block diagram of the base transceiver station.

As shown in FIG. 2, the base transceiver station 5 is comprised of an FP transmission/reception function section 11 that is an interface between the radio network controller 4 and mobile terminal 6, and a flow control function section 12 that performs flow control between the radio network controller 4 and base transceiver station 5. Further, the flow control function section 12 has a CA calculating section 14, Ui rate calculating section 15, Uu rate calculating section 16 and CPU utilization measurement function section 17.

The FP transmission/reception function section 11 communicates with the radio network controller 4 by HS-DSCH frame protocol, and performs processing for receiving transmission data from the radio network controller 4, while processing data output from the flow control function section 12 by the FP to transmit to the radio network controller 4.

The Ui rate calculating section 15 measures a break, dropout, discard, etc. of data in Iub (Interface between an RNC and a Node B) that is an interface between the radio network controller 4 and base transceiver station 5, and calculates channel quality (hereinafter, referred to as a Ui rate) of Iub.

More specifically, when congestion occurs in Iub, the Ui rate calculating section 15 monitors the sequence number and checksum contained in transmission data from the radio network controller 4, determines whether or not the sequence numbers are continued, and whether or not a checksum is in agreement, thereby measures a break, dropout, discard, etc. of data in Iub, and calculates the Ui rate in Iub. The Ui rate calculating section 15 outputs the calculated Ui rate to the CA calculating section 14.

The Uu rate calculating section 16 calculates a buffer retention data flushing time that is a time during which the transmission data from the radio network controller 4 is stored in the buffer in the base transceiver station 5 before being transmitted to the mobile terminal 6, and calculates radio quality (hereinafter, referred to as a Uu rate) in the radio channel.

More specifically, the Uu rate calculating section 16 monitors predicted throughput predicted from radio reception conditions of the mobile terminal 6 and the number of connected terminals, calculates the buffer retention data flushing time from the predicted throughput and the amount of data to the mobile terminal 6 stored in the buffer, and calculates the Uu rate. The Uu rate calculating section 16 outputs the calculated Uu rate to the CA calculating section 14.

The CPU utilization measurement function section 17 measures the CPU utilization of the base transceiver station 5, and outputs the measured CPU utilization to the CA calculating section 14.

The CA calculating section 14 calculates the permissible data amount that the base transceiver station 5 is capable of receiving from the radio network controller 4, based on the Ui rate output from the Ui rate calculating section 15 and the Uu rate output from the Uu rate calculating section 16. Further, the CA calculating section 14 corrects the calculated permissible data amount corresponding to the CPU utilization output from the CPU utilization measurement function section 17.

More specifically, the base transceiver station 5 has a permissible data amount correction table indicating the relationship between the threshold and correction amount as shown in FIG. 3, and using the permissible data amount correction table, corrects the permissible data amount. The permissible data amount correction table associates the CPU utilization threshold, correction cancellation threshold, and CA rate reduction amount (permissible data amount reduction amount) with one another for each threshold to set. The CPU utilization threshold is a threshold of the CPU utilization to start a correction to the permissible data amount, the correction cancellation threshold is a threshold of the CPU utilization to finish the correction to the permissible data amount, and the CA rate reduction amount is a correction amount for the permissible data amount.

For example, in the case where the base transceiver station 5 is set for threshold #1 and threshold #2, the correction is made to decrease the permissible data amount by 100 kbps when the CPU utilization output from the CPU utilization measurement function section 17 exceeds 60%, and is further made to decrease the permissible data amount by 200 kbps when the CPU utilization exceeds 80%. Meanwhile, when the CPU utilization output from the CPU utilization measurement function section 17 falls below 60%, the correction amount for the permissible data amount decreases from 200 kbps to 100 kbps, and when the CPU utilization falls below 40%, the correction to the permissible data amount is cancelled.

Further, when the CA calculating section 14 calculates the permissible data amount, the CA calculating section 14 includes the permissible data amount in the permissible data amount control signal to output to the FP transmission/reception function section 11. The permissible data amount control signal is processed by the FP in the FP transmission/reception function section 11, transmitted to the radio network controller 4, and is used to control the transmission data amount in the radio network controller 4. Thus, the CA calculating section 14 calculates the permissible data amount by considering not only the Ui rate and Uu rate but also the CPU utilization.

Figure 4:
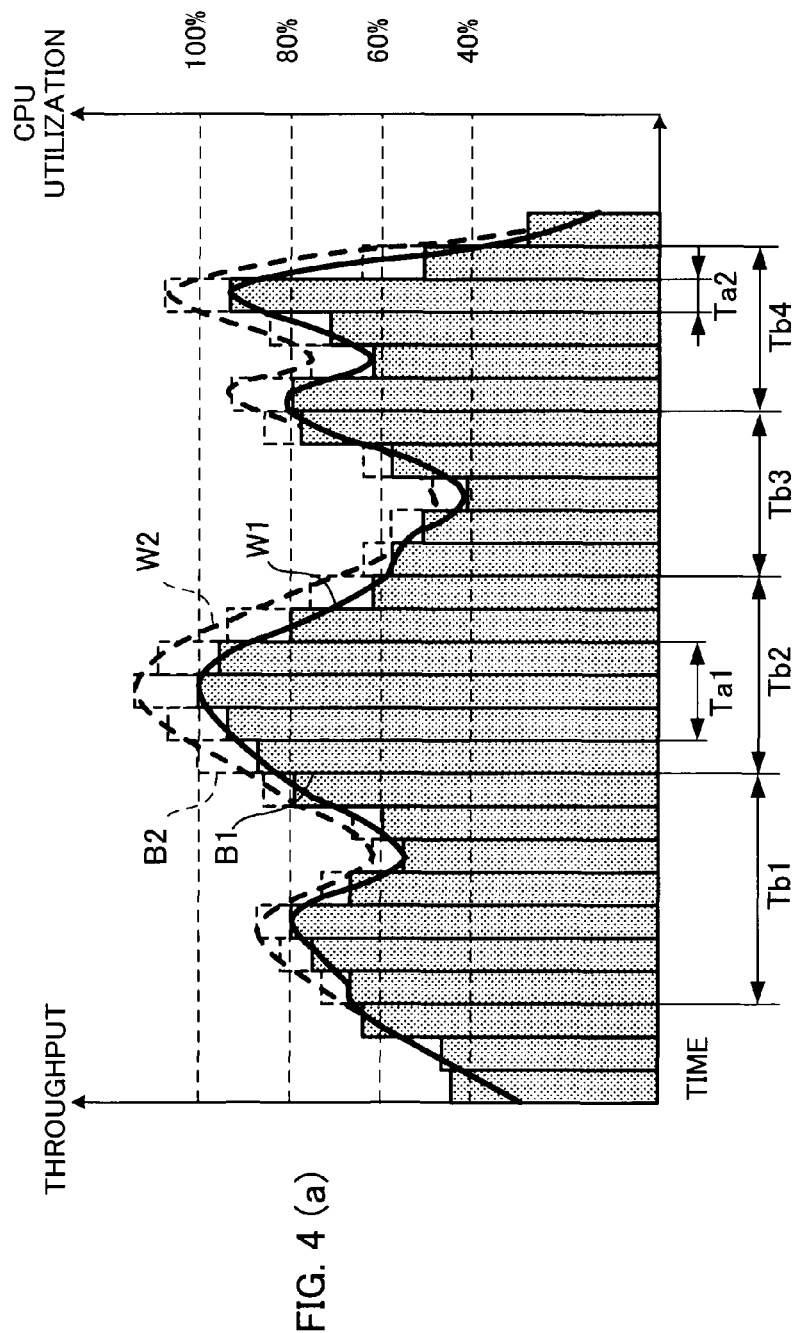
FIG. 4 contains views showing an embodiment of the base transceiver station according to the invention, where

Referring to FIGS. 4(a) and 4(b), described next is the relationship between the CPU utilization and throughput. FIG. 4(a) shows graphs for comparing the CPU utilization and throughput of the base transceiver station according to this embodiment with the CPU utilization and throughput of a conventional base transceiver station without including the CPU utilization in calculation parameters for the permissible data amount, and FIG. 4(b) is a permissible data amount correction table of the base transceiver station according to this embodiment. In addition, in FIG. 4(a), the curved graph of solid line W1 indicates the CPU utilization of the base transceiver station according to this embodiment, the curved graph of dashed line W2 indicates the CPU utilization of the conventional base transceiver station, the bar graph of solid line B1 indicates throughput of the base transceiver station according to this embodiment, and the bar graph of dashed line B2 indicates throughput of the conventional base transceiver station.

As shown in FIG. 4(a), in the conventional base transceiver station, since the CPU utilization is not included in calculation parameters for the permissible data amount, and the permissible data amount is calculated based on the Ui rate and Uu rate, when the radio network controller 4 transmits a transmission data amount exceeding the processing capability of the conventional base transceiver station, the CPU utilization of the conventional base transceiver station exceeds 100% as shown at time interval Ta1 and time interval Ta2. Therefore, there is the possibility that the operation of the conventional base transceiver station becomes unstable, and that malfunctions occur in other functions such as call processing control, monitoring control and the like, as well as the reception function.

However, in the base transceiver station 5 according to this embodiment, since the CPU utilization is included in calculation parameters for the permissible data amount, and the permissible data amount calculated based on the Ui rate and Uu rate is corrected based on the CPU utilization, the CPU utilization of the base transceiver station 5 is controlled to within 100%. In this case, in the base transceiver station 5, the permissible data amount correction table as shown in FIG. 4(b) is set for threshold #1 and threshold #2. In threshold #1, the CPU utilization threshold is 60%, the correction cancellation threshold is 40%, and the CA rate reduction amount is 100 kbps. In threshold #2, the CPU utilization threshold is 80%, the correction cancellation threshold is 60%, and the CA rate reduction amount is 200 kbps.

Then, during the time interval Tb1 lapsed until the CPU utilization shown by solid line W1 exceeds 80% after exceeding 60%, since the correction is made so that the permissible data amount decreases by 100 kbps, the throughput is reduced by 100 kbps as compared with the conventional example. During the time interval Tb2 lapsed until the CPU utilization falls below 60% after exceeding 80%, since the correction is made so that the permissible data amount decreases by 200 kbps, the throughput is reduced by 200 kbps as compared with the conventional example. Further, during the time interval Tb3 lapsed until the CPU utilization exceeds 80% again after falling below 60%, the throughput is reduced by 100 kbps as compared with the conventional example, and during the time interval Tb4 lapsed until the CPU utilization falls below 60% after exceeding 80% again, the throughput is reduced by 100 kbps as compared with the conventional example.

Thus, by correcting the permissible data amount corresponding to the CPU utilization, since the throughput of the base transceiver station 5 is reduced, the CPU utilization is controlled to within 100%, and the operation of the base transceiver station 5 becomes stable. In addition, in this embodiment, threshold #1 and threshold #2 are set in the permissible data amount correction table, but the number of thresholds is not limited particularly. Further, two thresholds, CPU utilization threshold and correction cancellation threshold, are associated with the CA rate reduction amount, but either one of the CPU utilization threshold and correction cancellation threshold may be associated with the CA rate reduction amount.

Figure 5:
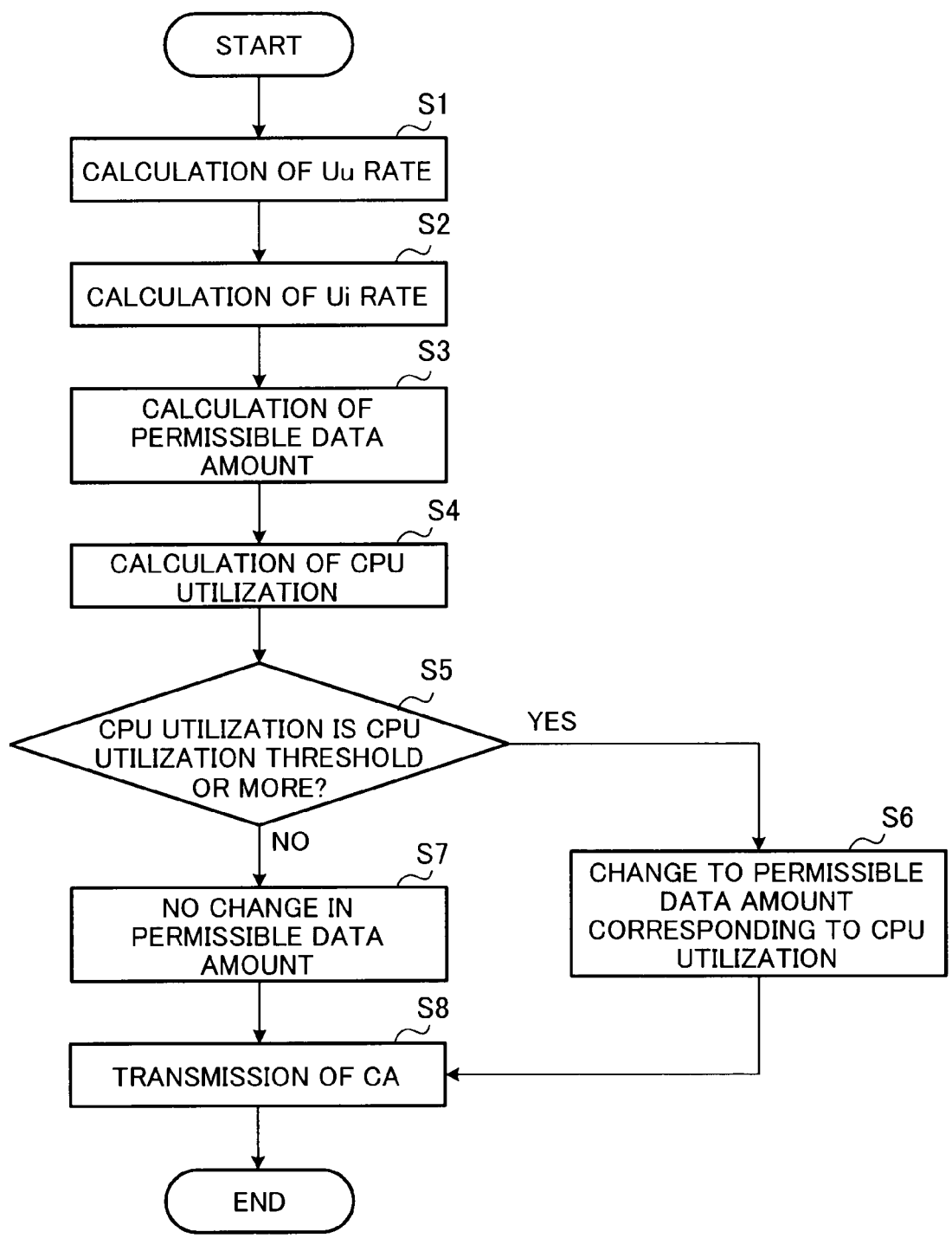
FIG. 5 is a view showing an embodiment of the base transceiver station according to the invention and is a flowchart of permissible data amount calculation processing of the base transceiver station.

Described next is permissible data amount calculation processing in the base transceiver station. FIG. 5 is a flowchart of the permissible data amount calculation processing in the base transceiver station. In addition, in this flowchart, for convenience in description, it is assumed that only the CPU utilization threshold is associated with the CA rate reduction amount in the permissible data amount correction table in the base transceiver station, and that the permissible data amount is corrected when the CPU utilization exceeds the CPU utilization threshold.

First, the Uu rate calculating section 16 calculates a Uu rate from predicted throughput for the mobile terminal 6 and the data amount left in the buffer (step S1).

Next, after the Uu rate is calculated in the Uu rate calculating section 16, the Ui rate calculating section 15 measures a break, dropout and discard of the data in Iub to calculate a Ui rate (step S2).

Then, the CA calculating section 14 receives the Uu rate and Ui rate calculated by the Uu rate calculating section 16 and Ui rate calculating section 15, and calculates a permissible data amount for the base transceiver station 5 to be able to receive from the radio network controller 4 (step S3).

Next, after the CA calculating section 14 calculates the permissible data amount, the CPU utilization measurement function section 17 calculates the CPU utilization of the base transceiver station 5 (step S4).

Then, the CA calculating section 14 receives the CPU utilization calculated in the CPU utilization measurement function section 17, reads the CPU utilization threshold out of the permissible data amount correction table, and determines whether or not the CPU utilization is the CPU utilization threshold or more (step S5).

When the CA calculating section 14 determines that the CPU utilization is the CPU utilization threshold or more (step S5: Yes), the CA calculating section 14 reads the CA rate reduction amount out of the permissible data amount correction table, and corrects the permissible data amount corresponding to the CPU utilization (step S6).

Then, the CA calculating section 14 includes the corrected permissible data amount into a permissible data amount control signal to output to the FP transmission/reception function section 11, and the FP transmission/reception function section 11 processes the permissible data amount control signal by the FP to transmit to the radio network controller 4 (step S8).

Meanwhile, when the CA calculating section 14 determines that the CPU utilization is less than the CPU utilization threshold (step S5: No), the permissible data amount is not corrected (step S7), and included into a permissible data amount control signal to output to the FP transmission/reception function section 11, and the FP transmission/reception function section 11 processes the permissible data amount control signal by the FP to transmit to the radio network controller 4 (step S8).

Then, when the radio network controller 4 receives the permissible data amount control signal, the radio network controller 4 controls the transmission data amount to the base transceiver station 5 based on the permissible data amount contained in the permissible data amount control signal, and is prevented from transmitting a transmission data amount exceeding the processing capability of the base transceiver station 5.

As described above, according to the base transceiver station 5 according to this embodiment, since the CPU utilization is included in calculation parameters for the permissible data amount, the permissible data amount is calculated in consideration of the processing capability of the base transceiver station 5. Accordingly, the radio network controller 4 does not transmit a transmission data amount exceeding the processing capability of the base transceiver station 5, and therefore, the base transceiver station 5 is capable of executing stable processing.

In addition, in this embodiment, the base transceiver station 5 is described as a small-size base transceiver station where the number of carriers is 1 or less and the number of maximum concurrent connections is 4 or less as an example, but the invention is not limited to this configuration. For example, the invention is applicable to a large-size base transceiver station installed outdoors.

Further, embodiments disclosed herein are illustrative in all the respects and are not limited to the embodiments. The scope of the invention is shown by the scope of claims, not only by descriptions in the above-mentioned embodiments, and is intended to embrace equivalent meanings to the scope of claims and all modifications in the scope.

This application is based on the Japanese Patent Application No. 2008-190750 filed on Jul. 24, 2008, the entire content of which is expressly incorporated by reference herein.

The present invention has the effect enabling stable processing to be executed in the radio communication system compliant with the HSDPA communication scheme, and particularly, is useful in a small-size low-cost base transceiver station with low processing capability, and channel rate control method.

What is claimed is:

1. A base transceiver station comprising:
a radio quality calculating section that obtains radio quality between a radio access network and a mobile terminal apparatus;
a channel quality calculating section that obtains channel quality between the base transceiver station and a radio network controller;
a CPU utilization measuring section that measures CPU utilization of the base transceiver station;
a memory that stores a table including a plurality of CPU utilization thresholds and a data rate reduction amount corresponding to each of the plurality of CPU utilization thresholds; and
a permissible data amount calculating section that calculates permissible data amount based on the radio quality, the channel quality, the CPU utilization, and the data rate reduction amounts corresponding to the CPU utilization thresholds stored in the memory, wherein
the base transceiver station is a small-size base transceiver station where the number of carriers is 1 or less, and is limited in a number of maximum concurrent connections.

2. The base transceiver station according to claim 1, wherein the table stored in the memory also includes a correction cancellation threshold corresponding to each of the plurality of CPU utilization thresholds.

3. The base transceiver station according to claim 2, wherein
the permissible data amount calculating section calculates the permissible data amount based on the correction cancellation thresholds stored in the memory.

4. The base transceiver station according to claim 1, wherein
the number of maximum concurrent connections is 4 or less.

5. The base transceiver station according to claim 1, wherein
the table includes a first CPU utilization threshold and a first data rate reduction amount corresponding to the first CPU utilization threshold, and a second CPU utilization threshold and a second data rate reduction amount corresponding to the second CPU utilization threshold, the first CPU utilization threshold being less than the second CPU utilization threshold and the first data rate reduction amount being less than the second data rate reduction amount.

6. The base transceiver station according to claim 5, wherein
the permissible data amount calculating section calculates the permissible data amount based on the first data rate reduction amount when the CPU utilization is greater than the first CPU utilization threshold and less than the second CPU utilization threshold.

7. The base transceiver station according to claim 5, wherein
the permissible data amount calculating section calculates the permissible data amount based on the second data rate reduction amount when the CPU utilization is greater than the first CPU utilization threshold and greater than the second CPU utilization threshold.

8. A channel rate control method comprising:
in a base transceiver station including a memory that stores a table including a plurality of CPU utilization thresholds and a data rate reduction amount corresponding to each of the plurality of CPU utilization thresholds,
obtaining radio quality between a radio access network and a mobile terminal apparatus;
obtaining channel quality between the base transceiver station and a radio network controller;
measuring CPU utilization in the base transceiver station;
calculating permissible data amount based on the radio quality, the channel quality, the CPU utilization, and the data rate reduction amounts corresponding to the CPU utilization thresholds stored in the memory; and
transmitting the permissible data amount from the base transceiver station to the radio network controller; and
in the radio network controller, controlling a channel rate between the radio network controller and the base transceiver station based on the permissible data amount, wherein
the base transceiver station is a small-size base transceiver station where the number of carriers is 1 or less, and is limited in a number of maximum concurrent connections.

9. The channel rate control method according to claim 8, wherein
the permissible data amount is calculated based on a correction cancellation threshold corresponding to each of the plurality of CPU utilization thresholds included in the table stored in the memory.

* * * * *